United States Patent Office 3,353,529
Patented Nov. 21, 1967

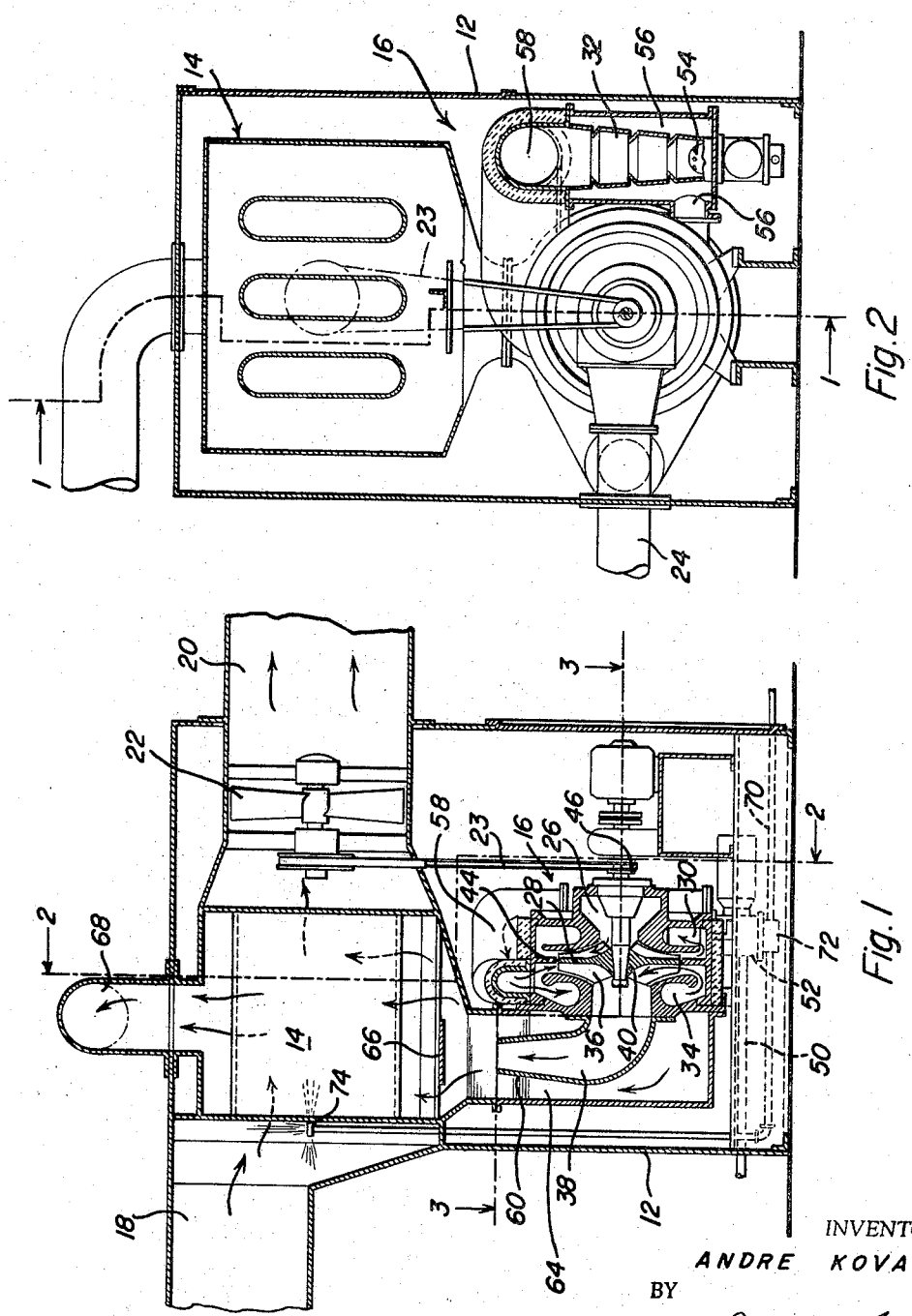

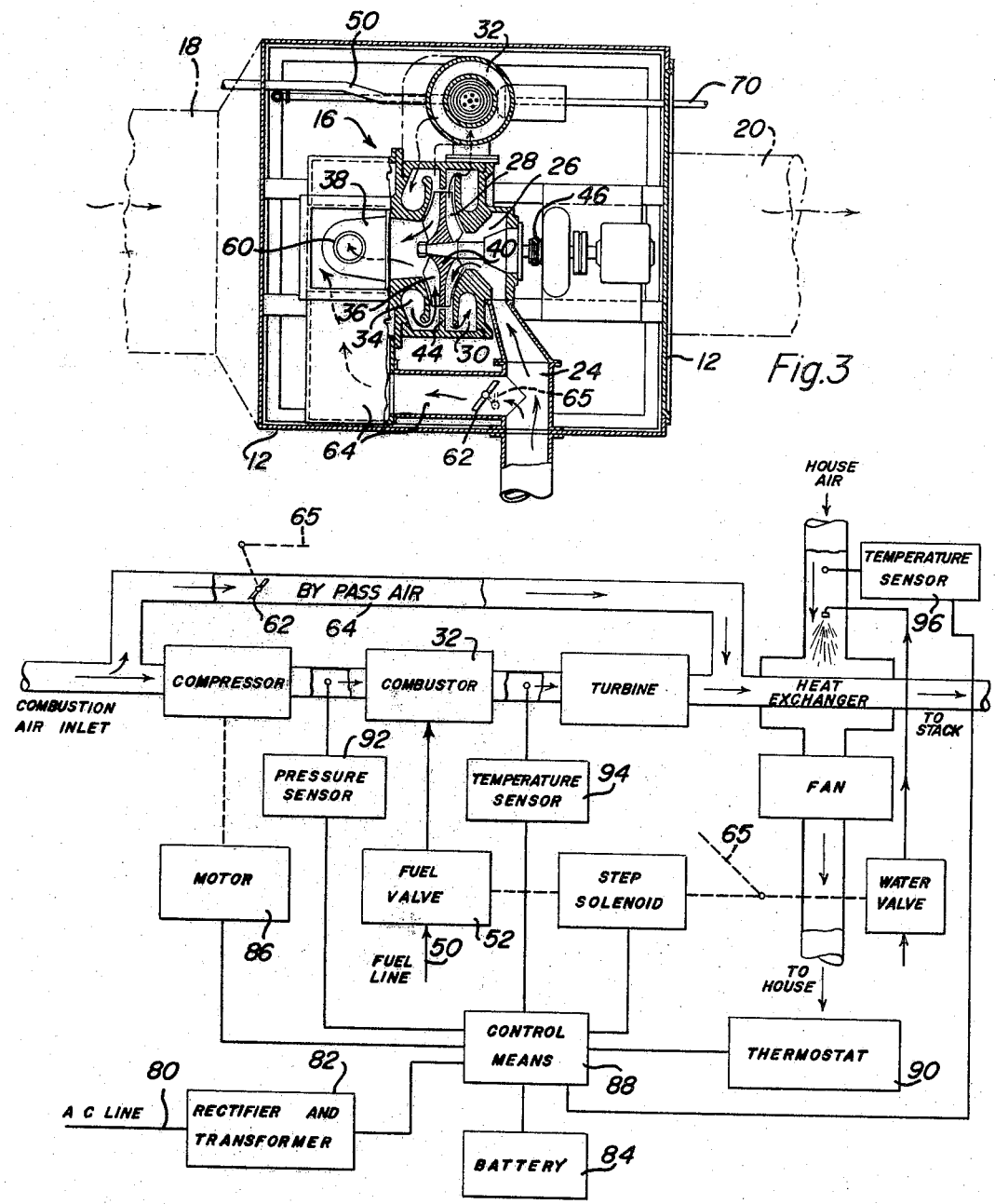

3,353,529
STATIONARY HOT AIR BUILDING HEATING
SYSTEM USING A GAS TURBINE DRIVEN
FAN
Andre Kovats, 13 Baker Road,
Livingston, N.J. 07039
Filed June 10, 1966, Ser. No. 556,729
10 Claims. (Cl. 126—110)

ABSTRACT OF THE DISCLOSURE

A stationary hot air building heating system using a gas turbine driven fan with the exhaust gases from the turbine passing in heat exchange with the building air to be heated, including means for cooling the turbine exhaust gases upstream of such heat exchange.

This invention relates to a hot air heating system especially adapted for building and house use, and in particular to a stationary heating unit wherein the circulating fan for the hot air has a direct drive connection with a turbine-compressor unit.

Hot air heating systems for houses are well known, and have a number of advantages over other systems, a primary one being that the system is well adapted to air conditioning a building with little additional cost. However, present hot air circulating systems suffer from a number of disadvantages, one being that the circulating fan for the hot air is usually driven by an electric motor. If the electric power supply fails, which frequently happens, heating is stopped.

A second disadvantage, which offers personal discomfort, is that present hot air heating systems are designed for constant on and off operation of the furnace, and a corresponding periodic variation of the house room temperature. The heat supplied to the house or building is dependent only on the frequency and length of period of heating. If the outside temperature is lowered, the furnace only heats more often and for longer periods.

A third disadvantage is that conventional hot air circulating systems are noisy, partly because of constant expansion and contraction of metallic components of the heating systems with varying temperature, and partly because of the high rate of flow of the circulating hot air required in the on and off operation.

Accordingly, it is an object of the present invention to provide a hot air heating system, especially adapted for building and house use, which overcomes the aforementioned disadvantages.

In particular, it is an object of the present invention to provide a reliable, inexpensive hot air heating system which does not rely on electric power, and which provides a constant flow of hot air at a desired temperature, and which further is free of circulation noise and other objections.

In accordance with the invention there is provided a method and apparatus for heating a building or house, wherein there is provided a hot air circulating fan for the building heating air (hereinafter referred to as primary air), and a heat exchanger in working relationship with the fan for raising the temperature of the primary air. The primary air in the heat exchanger is passed in indirect heat exchange with the exhaust flow from a turbine-compressor unit, which unit not only provides the heat input to the primary air but also the energy for driving the primary air circulating fan. As the circulating fan is directly connected to the turbine-compressor unit, and the latter runs continuously while heating is required, the heating primary air also is circulated in the building continuously during the heating period. Accordingly, the rate of circulation and fan speed can be less than that required with the on and off operation of a conventional unit, providing a correspondingly reduced noise level from air circulation and fan speed. Also avoided are the expansion and contraction noises of the metallic components experienced with conventional on and off units. Further, since the fan is turbine driven, loss of heating with an electrical power failure is avoided.

It is a concept of the invention that the fuel input to the turbine-compressor unit should almost exactly match heat requirements for the circulating primary air. This is made possible since the speed-power characteristics for the compressor and circulating fan are the same as for the turbine. In addition, the design of the system is such that the power loss for circulating the heating primary air will constitute less than 2% of the total heat input to the turbine-compressor unit. Accordingly, as it is a simple matter to control fuel input, it is a correspondingly simple matter to maintain a substantially constant desired temperature in the circulating primary air. In the latter respect, as the turbine-compressor unit is not designed to produce power, efficiency of these components is not a criteria. Accordingly, the unit will operate at a relatively low turbine inlet temperature, less than 1000° F., and at a relatively low pressure ratio, less than 1.1. Either a high temperature or a high pressure is needed for high efficiency. Thus the unit can be inexpensively made from castings, with low cost alloy metals.

In a preferred embodiment, the exhaust flow from the turbine-compressor unit is blended with cold secondary air (source air for the turbine-compressor unit) to lower the temperature of the exhaust flow. This is accomplished by means of a nozzle for the turbine exhaust flow within a secondary cold air duct siphoning the cold air into the exhaust flow. Reducing the temperature of the exhaust flow permits the use of lower temperature materials in the heat exchanger, and increases the safety of a hot air system for house and building use.

The invention and other advantages thereof will become apparent upon consideration of the following specification and accompanying drawings, in which FIGURE 1 is an elevational view of the heating system of the invention, in cross section, showing in detail the turbine-compressor unit and heat exchanger arrangement in accordance with the invention, taken along line 1—1 of FIG. 2;

FIGURE 2 is a section view taken along line 2—2 of FIG. 1;

FIGURE 3 is a top plan section view taken along line 3—3 of FIG. 1;

FIGURE 4 is a flow diagram showing the arrangement of components of the heating system, and control scheme therefor.

Figure 5:
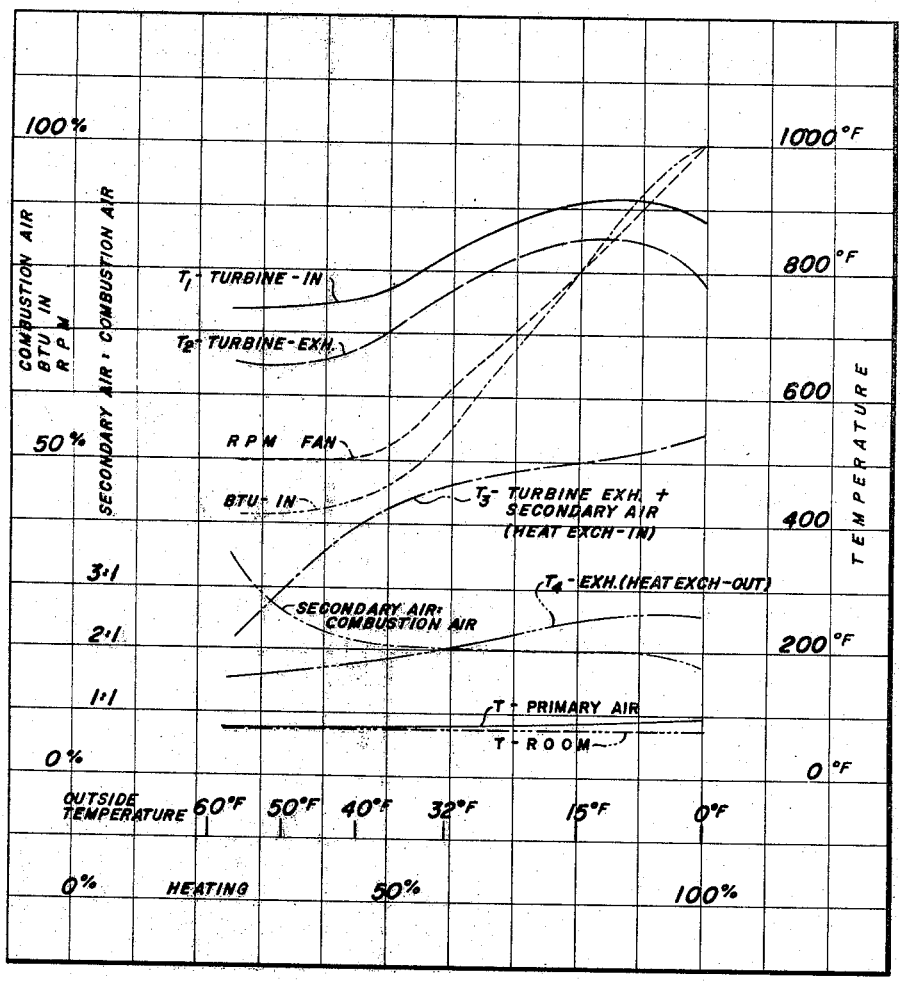
FIGURE 5 is a graph showing relationships between the heating system components and conditions and ambient temperature.

Referring to the drawings, the furnace or heating system comprises a housing 12 which contains a heat exchanger 14 and turbine-compressor unit generally designated 16. Primary air inlet and circulation ducts 18 and 20 pass through the housing wall in series arrangement with the primary side of the heat exchanger 14, and a fan 22 in the primary air duct 20 causes the circulation of primary air through the building or house being heated. The fan is suitably driven by a belt 23 or other means connected to the turbine-compressor unit 16.

Combustion air enters the furnace housing through a separate duct 24 (best shown in FIGS. 2 and 3), where it leads to the compressor inlet chamber 26 of the turbine-compressor unit. Details of the turbine and compressor are best shown in FIGS. 1 and 3.

The compressor is of the centrifugal type, characterized in that air entering the inlet chamber is forced outwardly by impeller blades 28 into the diffusion chamber 30 of the compressor, from which it flows to the combustor 32 (FIGS. 2 and 3) of the turbine-compressor unit. From the combustor 32, in which the air is heated to a temperature preferably below 1000° F., the air enters the volute section 34 for the turbine rotor blades 36, which are of the centripetal type, exhausting into passageway 38, best shown in FIG. 1.

The turbine and compressor unit comprises a single or common hub 40 which carries both the turbine and compressor blades (28, 36), on opposite sides of the hub 40. The volute casing for the turbine and compressor also is a single casting with the volute sections for the turbine and compressor being divided by a wall 44 in the plane of the rotor hub 40. The common compressor-turbine rotor or hub is mounted overhung on a shaft which rotates in suitable bearings, the shaft also containing a pulley 46 between the hub bearings to which fan belt 23 is connected. It should be noted that the only high temperature parts of the turbine-compressor unit are in the volute section of the turbine casing and passageway between the combustor and turbine, which parts can be suitably insulated.

The combustor 32 is of a conventional type, wherein a fuel such as gas or oil is supplied by line 50 through solenoid operated valve 52. The fuel line enters the bottom of the combustor and the fuel is injected into the combustor through a suitable nozzle 54 (FIG. 2). The combustor itself is a perforated cone in which the fuel is mixed with air from the compressor, the air entering into the space 56 surrounding the combustor cone. The fuel burns within the cone, with hot exhaust gases passing out the top into passageway 58 (FIGS. 1 and 2) leading to the turbine volute section 34. A pilot flame (not shown) inside the combustor cone ignites the fuel at start-up.

From passageway 38, at the outlet of the turbine, the combustion gas exits through nozzle 60, which draws secondary cold air from passageway 64 (FIG. 1). As shown in FIG. 3, the passageway 64 is a bypass from the combustion air inlet duct 24. A suitable butterfly valve 62 (FIG. 3) is disposed within the passageway 64 for control of the ratio of cold secondary air to turbine exhaust air flowing into the heat exchanger 14. The butterfly valve, regulating the ratio of cold secondary air, is responsive, through linkage 65 (FIGS. 3 and 4), to movement of solenoid fuel valve 52, for reasons to be shown. In general, the ratio of the secondary air to turbine exhaust air can be kept constant over normal operation, but in extreme conditions, when forced heating or reduced heating are required, less or more cold secondary air may be admitted to the turbine exhaust air. In the heat exchanger 14, the combined flows pass in indirect heat exchange, on the secondary side of the heat exchanger, with the primary air flow of the house circulating air. A baffle 66 at the bottom of the heat exchanger directs the heating gas flow across the entire exchanger, and the cooled gas is exhausted through chimney 68.

Several additional features of the heating system can be noted. To humidify the house circulating air, water is taken from a domestic waterline 70 (FIG. 1), the flow being regulated by a valve 72 connected to the fuel regulating valve 52 and sprayed by nozzle 74 into the incoming air in conduit 18. Since the speed of the fan, and the recirculated air, is proportional to the speed of the turbine, which in turn is proportional to the heat required for heating the air, the valve 52, regulating the gas flow and being connected to the water regulating valve, assures a constant proportion of water and air.

FIG. 4 shows the electrical and control connections for the system. The voltage of the incoming power (item 80) is stepped down and converted to D.C. in the combined transformer and rectifier 82. A rechargeable battery 84 is connected to the D.C. side of the transformer-rectifier as a standby for the case of power failure. This battery can be quite small, since the starter motor 86 can be of low power, in this example, about 0.1 to 0.2 HP, and the solenoid 52 will require little power. The motor is connected to the turbine shaft by an overspeed coupling, which lets the turbine rotate free when the turbine speed is higher than that of the starter motor.

In operation, a thermostat control switch 88 sets the valve openings of fuel line valve 52 in steps (two or more) from closed to wide open. The thermostat 90 as usual operates on the deviation of room temperature from a preset temperature. When the fuel valve is closed and the thermostat gives the signal for starting the heating, the control means 88 connects the current of the D.C. side of the transformer to the starter motor 86, and the starter drives the turbine, which speeds up. When the air pressure of the compressor is sufficient for operation of the turbine, the pressure sensor 92 gives a signal to the valve control switch 88, which opens the valve 52, and fuel flows in the combustor 32 where it is ignited by a pilot flame. The thermocouple 94 built in the entrance of the turbine, responsive to the temperature at this point, transmits a signal to control means 88 and disconnects the starter-motor 86 from its current of electricity.

If for some reason (for example an extinguished pilot flame) the fuel fails to ignite, the thermocouple indicates this fact, and the pressure sensor, which is provided with a time delay relay, closes the fuel valve 52 and disconnects the starter-motor 86.

If the fan fails to operate (for example the belt drive falls off), the air temperature inside the housing rises over a preset temperature, and the second thermocouple 96 provides a signal to control means 88 which closes fuel valve 52.

When the room temperature becomes higher than that for which the thermostat 90 is set, the thermostat gives a signal to control means 88 which closes the valve 52 one step. If the temperature is too low, the valve opens one step.

*Example*

To assure proper operation of the system, it is only necessary to select characteristics of the turbine to match two requirements: First to operate at a temperature, pressure and mass flow corresponding to the heat requirements of the primary air circulated through the building: and second, to develop a power equal to the power consumption of the compressor and fan.

These requirements are satisfied if (1) Heat required to heat bldg.=heat input—circulating fan work—stack heat loss
(2) Turbine work=compressor work+circulating fan work.

One limitation is that the heat input relative the secondary air mass flow in the turbine-compressor unit is selected so that the temperature in the turbine does not exceed a predetermined amount, in this example, 930° F., compatible with turbine materials. As a second limitation, the ratio of cold secondary air to turbine exhaust air is selected to obtain a permissible mixture temperature compatible with materials used in and the design of the heat exchanger.

In this example, a three bedroom house requires, for heating, 100,000 B.t.u.'s/hour. Relatively low turbine, fan and compressor efficiencies are used as follows:

$$n_{turbine} = n_t = 0.80$$
$$n_{compressor} = n_c = 0.75$$
$$n_{fan} = n_f = 0.75$$

The fan circulates primary air within the house at the rate of 60 cu. ft. per sec. Other data is calculated as follows:

Turbine Data:

Turbine inlet temperature: 930° F.

$$\text{Air Mass (lbs./sec.)} = \frac{Q(\text{B.t.u./sec.})}{\text{Temp.} \times C_p \text{ (specific heat air)}}$$

$$= \frac{\frac{100,000}{3600} \text{ B.t.u./sec.}}{930° \text{F.} \times 0.25 \text{ B.t.u./lb. } ° \text{F.}}$$

$$= 0.120 \text{ lbs./sec.}$$

Air Mass (cu. ft./sec.): = lbs./sec. × cu. ft./lb.
$$= 0.120/.0753$$
$$= 1.6 \text{ cu. ft./sec.}$$

Enthalpy drop ($\Delta T = 18°$ F): = 3380 ft.

Work output (turbine): = Enthalpy drop × air mass.
$$= 3380 \text{ ft.} \times 0.120 \text{ lbs./sec.}$$
$$= 405 \text{ ft. lbs./sec.}$$

Turbine efficiency: = 0.80

Exponential index ($n$): = 1.3

Pressure ratio $\frac{(P_{in})}{(P_{out})}$: $= \frac{(T_{in})}{(T_{out})} \frac{n}{n-1}$ $$= \frac{(930)}{(912)} 4.35$$
$$= 1.056$$

This is the pressure ratio necessary to obtain the desired enthalpy (temperature) drop and work output. As the turbine exhausts to atmosphere, it is apparent that the unit is relatively low pressure. The turbine can also be relatively low speed, in the order of 4000–6000 r.p.m.

Compressor data:

Head = pressure increase ($H_{ft.}$): $= \frac{\text{Pressure ratio} \times \text{Atmospheric pressure}}{\text{Density (lbs./cu. ft.)}}$ $$= \frac{(1.056 - 1.0) \times 14.7 \times 144}{0.0753}$$
$$= 1570 \text{ ft.}$$

Compressor efficiency ($n$): = 0.75

Compressor work: $= \frac{\text{Pressure increase} \times \text{air mass}}{\text{Compressor eff.}}$ $$= \frac{1570 \text{ ft.} \times 0.120 \text{ lbs./sec.}}{0.75}$$
$$= 250 \text{ ft. lbs./sec.}$$

Available work: $= W_{\text{Turbine}} - W_{\text{Compressor}}$
$$= 405 - 250$$
$$= 155 \text{ ft. lbs./sec.}$$

Fan data:

Head: = 26.2 feet

Air mass: = 60 cu. ft./sec. × .0753 lbs./cu. ft.
$$= 4.52 \text{ lbs./sec.}$$

Efficiency ($n$): = 0.75

Fan work: $= \frac{\text{Air mass} \times \text{Head}}{\text{Efficiency}}$ $$= \frac{4.52 \text{ lbs./sec.} \cdot 26.2 \text{ ft.}}{0.75}$$
$$= 155 \text{ ft. lbs./sec.}$$

Fan diameter is about 1.3 feet, and fan speed is about 1750 r.p.m.

With an average secondary air ratio of about 2 to 1 (cold air to turbine exhaust air) the temperature of the heating gas entering the heat exchanger is essentially constant at about 400–500° F. If the secondary air ratio is increased to about 3 to 1, the temperature in the heat exchanger is correspondingly smaller, but still essentially constant (Note T primary air, FIG. 5).

It is apparent from the above data that the second Formula 2 above is satisfied; i.e., the power developed by the turbine equals power consumption of the compressor and fan.

Turning to Formula 1, this can be written as:

$$100,000 \text{ B.t.u./sec.} = \left(H_{in} - \frac{H_f \times W_{air}}{W_t \times n_f} - H_{out} \times \frac{W_{out}}{W_t}\right)\frac{W_t}{778.2}$$

where $H_{in}$ = enthalpy in feet generated by the compressor,
$H_f$ = head in feet produced by the fan,
$W_{air}$ = mass flow of air in lbs./sec. circulated by the fan through the building,
$H_{out}$ = enthalpy in feet of the combustion product leaving the heat exchanger,
$W_{out}$ = mass flow leaving the heat exchanger,
$W_t$ = mass flow of air delivered to turbine and combustion products therefrom ($W_t$ differs from $W_{out}$ in the amount of cold secondary air added to the combustion products upstream of the heat exchanger),
778.2 = the conversion factor of B.t.u. in ft. lbs.

The stack heat loss $$\left(H_{out}\frac{W_{out}}{W_t}\right)$$

would be the same for any hot air heating system, and depends upon the design of the heat exchanger.

Equation 1 shows that amounts of heat produced by losses to the compressor and turbine, including efficiency losses, are utilized for heating the house circulating air, and thus do not show up as overall system losses. As the circulating fan losses $$\left(\frac{H_f W_{air}}{W_t \times n_f}\right)$$

are very small, as can be shown by the following calculations:

Percentage of heat input absorbed by the circulating fan $= \frac{\text{Turbine enthalpy drop} \times \text{Turbine eff.}}{930° - 70° \text{ (ambient)}}$ $$= \frac{18° \times .80}{860}$$
$$= 1.68\%$$

or $$= \text{approximately } 1680 \text{ B.t.u./hr.}$$

the overall efficiency of the heating system, obviously, is very high.

The relationships of FIG. 5 serve also to illustrate the invention.

First the heat input into the building, "B.t.u. in," is regulated simply by regulating fuel supply. The temperature of the primary air, "T primary air," remains fairly constant, somewhat above room temperature, "T room," so that heat input into the building depends primarily upon circulating fan speed, "r.p.m.," and the latter varies directly with fuel input.

Over the intermediate ambient temperature range, about 10° F. to about 50° F. in this example, "$T_1$" and "$T_2$," turbine inlet and outlet temperatures also vary directly with fuel input. The secondary air to combustion air ratio remains essentially constant and the heat exchanger temperatures, "$T_3$" and "$T_4$," follow the curves shown. At temperature extremes, control changes may be required.

For instance, above 50° F., ambient temperature approaches room temperature, but turbine characteristics require little further reduction in fuel input and fan r.p.m., and this curve levels off. To avoid excessive heating of the primary air, i.e., to maintain the temperature of the primary air constant, stack losses are increased by increasing the ratio of secondary cold air to combustion air. This is accomplished simply by design and adjustment of the butterfly valve 62, and linkage 65, using known principles, so that the secondary air-combustion air ratio follows a desired in response to movement of the fuel valve. In other words, a small movement in the fuel valve will effect a large increase in the opening of the secondary air passageway 64, in the temperature range above 50° F. ambient. Similarly, below 10° F., where the turbine exhaust temperature tends to decrease, the linkage and valve 62 are designed to increase the closure of the secondary air passageway 64 reducing the amount of secondary air added to the turbine exhaust.

As an alternative, the butterfly valve could be made responsive to temperature of the primary air to maintain the latter constant slightly above room temperature.

It should be pointed out that this control by fuel input is made possible primarily since the speed-power characteristics of the compressor, and circulating fan, are the same as those for the turbine. The low heat loss to the circulating fan and recovery of compressor and turbine heat losses by heat transfer to the primary air also make the direct relationship between fuel input and building heat input possible.

Other advantages of the invention should now be evident. As the heat input to the building is continuously maintained over a period of time, the rate of circulation of heating primary air can be lessened, with a correspondingly lower noise level of the circulating primary air. Also avoided are expansion and contraction noises of metallic components in the system. As another advantage, the low efficiencies required of the turbine and compressor, with correspondingly low temperatures and pressure ratios, allows the use of low cost alloy cast materials in these components. The freedom from dependency on electricity for heating also is evident.

Also evident in the present invention is the flexibility of design made available. It is a simple matter to design the turbine-compressor-combustor unit to provide a mass-exhaust flow matching heating requirements. Only a minimal energy loss to power consumption of the fan need be taken into consideration, with more than adequate adjustment being available in proportioning the ratio of secondary cold air to secondary exhaust air.

A safety aspect of the invention lies in the fact that the primary air flow path is independent and separate from the secondary air path. If gas leakage occurs in the combustor 32 the gas will simply flow out the stack 68 (FIG. 1) through the compressor and turbine components including passageway 38 and through the heat exchanger 14 without mixing with house air. Also, explosions in the secondary air flow path will simply dissipate through the stack 68.

Relative these advantages, it may be mentioned that gas turbines have been used in connection with space heating, designed to circulate primary air heated by the turbine exhaust. However, these units are designed to force a large amount of high velocity very hot air intermittently into a room or enclosure, and are unsuitable for building heating. They offer no suggestion of a design substitute for conventional building hot air heating systems. Being intermittent, circulation and expansion and contraction noises are experienced. Being high speed, they require precision machining, and high temperatures require expensive alloy materials. They also provide no means for keeping gas from the enclosure or room being heated in the event of a gas leak, improper combustion, or failure of the pilot flame.

As one alternative, the system can be used for air conditioning a building. The same primary air ducts would be used. If it is desired to use the same circulating fan, a high voltage A.C. drive motor can be substituted for the low voltage D.C. starting motor, both motors being provided with a suitable engagement and disengagement arrangement. The control means would then be operably connected to the A.C. motor, and would be made responsive to an air conditioning thermostat. If it is desired to use only an A.C. motor, both heating and air conditioning, it is a simple matter to provide a crank outside of the housing 12, connected to the turbine, for starting the latter in the event of a power failure.

Although the invention has been described with reference to specific embodiments, variations within the spirit and scope of the claims will be apparent to those skilled in the art.

What is claimed is:

1. A hot air heating system for continuous operation during a heating period comprising
   a first air doct for distribution of primary heating air;
   heat exchange means in series flow with the air duct having a primary side for flow of the heating air, a secondary side in heat exchange relationship with the primary side;
   a fan in the first air duct for forced circulation of the heating air;
   a gas turbine-compressor drive means connected to the fan;
   means to supply secondary air to the turbine-compressor drive means;
   combustion chamber means intermediate the turbine and compressor to provide an enthalpy input to the secondary air;
   fuel valve means to vary the fuel input to the combustion chamber;
   second duct means between the turbine outlet and heat exchange means secondary side to transmit the flow of turbine exhaust air to the heat exchange means secondary side;
   third duct means to introduce secondary cold air into the turbine exhaust air upstream of the heat exchange means to reduce the temperature of the flow on the heat exchange means secondary side; and
   means to vary the ratio of secondary cold air added to the turbine exhaust air so that primary heating air is maintained at a substantially constant temperature during said heating period.

2. The heating system of claim 1 wherein said last mentioned means comprises a butterfly valve in said third duct means, linkage means connecting the butterfly valve to said fuel valve means, the characteristics of the butterfly valve being arranged to obtain a predetermined ratio of secondary air dependent on fuel input.

3. The heating system of claim 2 including control means to limit the turbine inlet temperature to less than 1000° F. and second control means to limit the heating of the primary air to a temperature slightly above room temperature.

4. The heating system of claim 3 further including third control means to control the mixing of the secondary air with the turbine exhaust air to the ratio of about 2:1 to about 3:1.

5. The heating system of claim 4 wherein said third control means includes means whereby the ratio of secondary cold air to turbine exhaust air remains essentially constant over normal operating range but decreases at extreme cold temperatures and increases when ambient temperature approaches room temperature.

6. The heating system of claim 2 further including a nozzle for the turbine exhaust air arranged to siphon cold secondary air into the turbine exhaust air.

7. A hot air heating system for continuous operation during a heating period comprising
- a first air duct means for distribution of primary heating air;
- heat exchange means in series flow with the air duct means having a primary side for flow of the heating air, a secondary side in heat exchange relationship with the primary side;
- a fan means in the first air duct means for forced circulation of the heating air;
- a gas turbine-compressor drive means connected to the fan;
- second duct means to supply combustion air to the turbine-compressor drive means;
- combustion chamber means intermediate the turbine and compressor to provide an enthalpy input to the combustion air;
- means to provide a variable fuel input to the combustion chamber;
- third duct means between the turbine outlet and heat exchange means secondary side to transmit the flow of turbine exhaust air to the heat exchange means secondary side;
- a siphon means in said third duct means;
- fourth duct means in communication with the siphon means to mix cool secondary air with the turbine exhaust air;
- a housing encompassing all of said means, the housing including separate inlet and outlet means for the flow of primary heating air and for the flow of secondary and combustion air whereby the flow of secondary and combustion air is kept entirely separate from the flow of primary air.

8. The heating system according to claim 7 wherein the duct means in communication with the siphon means is a branch of the second duct means, the second duct means extending through the housing, the siphon means comprising a nozzle receiving the turbine exhaust flow encompassed by said branch of the second duct means.

9. The heating system of claim 7 wherein the turbine-compressor drive means comprises a single rotor hub, oppositely facing compressor and turbine blades of the centrifugal and centripetal type respectively mounted on said hub in contiguous relationship except for the hub between the blades, a single housing for said hub also comprising a dividing wall in the plane of the hub and in sealing relationship therewith defining volute sections for the compressor and turbine blades, the combustion chamber being disposed in the flow path intermediate the compressor and turbine volute sections.

10. A heating system comprising
- a first air duct for distribution of primary heating air;
- heat exchange means in series flow with the air duct having a primary side for flow of the heating air, a secondary side in heat exchange relationship with the primary side;
- the first air duct and heat exchanger primary side defining a primary flow path;
- a fan in the first air duct for forced circulation of the heating air;
- a gas turbine-compressor drive means connected to the fan;
- second duct means to supply secondary air to the turbine-compressor drive means;
- combustion chamber means intermediate the turbine and compressor to provide an enthalpy input to the secondary air;
- fuel valve means to vary the fuel input to the combustion chamber means;
- conduit means between the turbine outlet and heat exchange means secondary side to transmit the flow of turbine exhaust secondary air to the heat exchange means secondary side;
- third duct means in communication with the conduit means adapted to admit cold secondary air into the turbine hot exhaust gas flow;
- control means for varying the ratio of cold secondary air to turbine hot exhaust gas flow;
- the second duct means, heat exchanger secondary side, third duct means and gas turbine-compressor drive means defining a secondary flow path;
- the primary and secondary flow paths being entirely separate.

References Cited
UNITED STATES PATENTS

| | | | |
|---|---|---|---|
| 2,062,605 | 12/1936 | Peters | 126—113 X |
| 2,714,378 | 8/1955 | Benedek | 126—110 |
| 2,975,783 | 3/1961 | Dallenbach | 126—110 |

JAMES W. WESTHAVER, *Primary Examiner.*